United States Patent [19]

Gates et al.

[11] Patent Number: 4,722,071
[45] Date of Patent: Jan. 26, 1988

[54] COMPILER FOR EVALUATING BOOLEAN EXPRESSIONS

[75] Inventors: Dirk I. Gates, Chatsworth; David B. Rosen, Canoga Park; Gary A. Jones, Chatsworth, all of Calif.

[73] Assignee: Pertron Controls, Corporation, Chatsworth, Calif.

[21] Appl. No.: 725,084

[22] Filed: Apr. 19, 1985

[51] Int. Cl.⁴ .................. G06F 9/44; G05B 11/01
[52] U.S. Cl. ..................... 364/900; 364/141; 364/300
[58] Field of Search ... 364/200 MS File, 900 MS File, 364/300, 147, 136, 141

[56] References Cited

U.S. PATENT DOCUMENTS

| | | | |
|---|---|---|---|
| 3,753,243 | 8/1973 | Ricketts et al. | 364/200 |
| 4,058,711 | 11/1977 | Ondercin et al. | 364/101 |
| 4,176,403 | 11/1979 | Suzuki et al. | 364/900 |
| 4,200,914 | 4/1980 | Kintner | 364/900 |
| 4,217,658 | 8/1980 | Henry et al. | 364/900 |
| 4,227,247 | 10/1980 | Kintner | 364/900 |
| 4,247,901 | 1/1981 | Martin et al. | 364/900 |
| 4,315,315 | 2/1982 | Kossiakoff | 364/300 |
| 4,316,260 | 2/1982 | Hideshima et al. | 364/900 |
| 4,415,965 | 11/1983 | Imazeki et al. | 364/136 |
| 4,417,305 | 11/1983 | Berstis | 364/300 |
| 4,432,047 | 2/1984 | Okayama | 364/147 |
| 4,441,161 | 4/1984 | Sasaki et al. | 364/900 |
| 4,443,865 | 4/1984 | Schultz et al. | 364/900 |
| 4,445,169 | 4/1984 | Wakita et al. | 364/147 |
| 4,449,180 | 5/1984 | Ohshima et al. | 364/147 |
| 4,455,619 | 6/1984 | Masui et al. | 364/900 |
| 4,488,258 | 12/1984 | Struger et al. | 364/900 |

OTHER PUBLICATIONS

*Logitrol Control 500* (*Programming Manual*), General Electric Co., (Bloomington, Ill., Jan. 1977), pp. 1-28 & back cover.

Primary Examiner—Raulfe B. Zache
Assistant Examiner—Florin Munteanu
Attorney, Agent, or Firm—Blakely, Sokoloff, Taylor & Zafman

[57] ABSTRACT

An intelligent compiler particularly useful for evaluating Boolean expressions such as those associated with ladder structures. True/false paths are defined through the expressions. In a first pass for the code generation, the start code for examining each element is set out. In a second pass the relative offsets for branching from one element to the next element along both the true and false paths are filled in. In practice, execution time for evaluating ladder structures is reduced by an order of magnitude over prior techniques which use source code and an interpreter.

25 Claims, 7 Drawing Figures

| | ELEMENT | TRUE PATH | FALSE PATH |
|---|---|---|---|
| | $I_0$ | $I_1$ | $I_2$ |
| RUNG 10 OF FIG. 1 | $I_2$ | $I_1$ | OFF (RUNG IS FALSE) |
| | $I_1$ | O1 ON | OFF (RUNG IS FALSE) |
| RUNG 11 OF FIG. 1 | $I_1$ | $I_4$ | $I_6$ |
| | $I_4$ | $I_5$ | $I_6$ |
| | $I_6$ | $I_5$ | $I_7$ |
| | $I_5$ | O2 ON | $I_7$ |
| | $I_7$ | $I_8$ | OFF |
| | $I_8$ | O2 ON | OFF |
Fig. 3
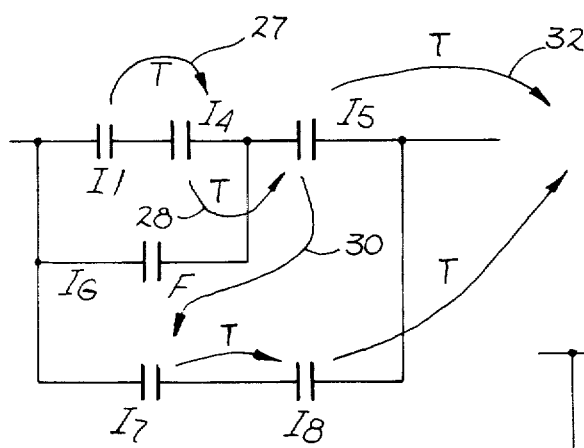
Fig. 5a
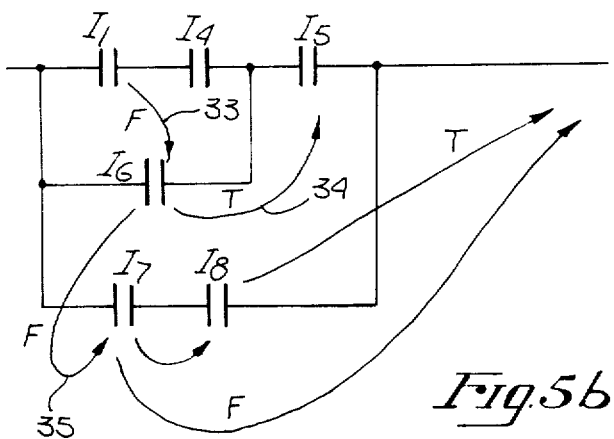
Fig. 5b

SKELETAL CODE FOR 6809

| ELEMENT | | INSTRUCTION | ADDRESS/OPERAND | |
|---|---|---|---|---|
| $I_0$ | 1 | lda | 0000 | ; input word 0 |
| | 2 | bita | #$01 | ; bit 0 test |
| | 3 | bne | XXXX | ; Tpath (offset to I1) |
| | 4 | bra | XXXX | ; Fpath (offset to I3) |
| $I_2$ | 5 | lda | 0000 | ; input word 0 |
| | 6 | bita | #$04 | ; bit 2 test |
| | 7 | bne | XXXX | ; Tpath (offset to I1) |
| | 8 | bra | XXXX | ; Fpath (offset to OFF) |
| $I_1$ | 9 | lda | 0000 | ; input word 0 |
| | 10 | bita | #$02 | ; bit 1 test |
| | 11 | bne | XXXX | ; Tpath (offset to o1) |
| | 12 | bra | XXXX | ; Fpath (offset to OFF) |

⋮

; Code for energize instruction goes here.

| O1 | 130 | lda | 0001 | ; ouput word 1 |
|---|---|---|---|---|
| | 131 | ora | #$01 | ; bit 0 test |
| | 132 | sta | 0001 | ; |
| | 133 | bra | XXXX | ; execute next rung |

; Code for O1 off goes here. (Rung False)

| OFF | 134 | lda | 0001 | ; output word one |
|---|---|---|---|---|
| | 135 | anda | #$fe | ; bit 0 test |
| | 136 | sta | 0001 | ; |
| | 137 | bra | XXXX | ; execute next rung |

*Fig. 4*

COMPILER FOR EVALUATING BOOLEAN EXPRESSIONS

BACKGROUND OF THE INVENTION

1. Field of the Invention

The invention relates to the field of digital computer compliers particularly compilers used in the evaluation of Boolean or like expressions, and a computer for executing a program compiled in accordance with the present invention.

2. Prior Art

The present invention was developed to provide more efficient evaluation of Boolean expressions associated with ladder structures. The invention is particularly useful in evaluating ladder rungs having logic elements such as are evaluated in programmable controllers. The prior art technique for evaluating such ladder structures is described within the detailed description of the invention. The advantages gained with the invented compiler when compared to this prior art technique are also discussed. As will be seen, in the prior art an interpreter was employed to interpret source code instructions. With the present invention, an intelligent compiler provides an object code program which is directly executed. The state of the elements drives the branching used in the object code program.

The Applicant is not aware of any prior art compilers using the invented method, nor is the Applicant aware of any computers such as the one described.

SUMMARY OF THE INVENTION

The present invention provides a method for evaluating a statement such as a Boolean expression which defines the interaction of a plurality of elements. The condition of the elements within the statement (such as ON or OFF) typically determines an action. For instance, the condition of the elements within a Boolean expression representing a rung in a ladder may determine whether or not the rung will have a true or false output.

For each condition of each element, the next element within the statement or expression which has an effect on the output or action is determined, thereby defining condition determining paths within the statement or expression. For example, true/false tables for each element are compiled defining true/false paths. In a Boolean expression this is done by ignoring disjunctive elements to find the true path and by ignoring conjunctive elements to define a false path.

In the preferred method, object code is generated in two passes. First, skeletal code is listed which includes instructions for the examination of each element. In a second pass, the branching along the true and false path is resolved by inserting the relative offsets (e.g., physical address) between the elements along the paths.

The program can be compiled to run on any one of a plurality of target computers. A computer particularly adapted for executing code compiled in accordance with the present invention is also disclosed.

BRIEF DESCRIPTION OF THE DRAWINGS

FIG. 3 is a chart used to describe the step of the present invention where the condition determining paths are identified.

FIG. 4 is a chart used to describe the steps of the present invention where code is generated in two passes.

FIG. 5a is a diagram of a ladder structure with arrows used to describe the operation of a program compiled in accordance with the present invention.

FIG. 5b is another diagram of a ladder structure with arrows used to describe the operation of a program compiled in accordance with the present invention.

DETAILED DESCRIPTION OF THE PRESENT INVENTION

A method for compiling a computer program particularly suited for evaluating Boolean expressions is described. Also, a computer for executing code so compiled is described. In the following description, numerous specific details are set forth such as code for a particular microprocessor, in order to provide a thorough understanding of the present invention. It will be obvious to one skilled in the art, however, that the present invention may be practiced without these specific details. In other instances, well-known program techniques and hardware are not described in detail in order not to unnecessarily obscure the present invention. The present invention is described in the context of a ladder structure since it was developed in this environment. It will be apparent, nonetheless, that the invented compiler can be used with other structures and to solve other problems.

PRIOR ART INTERPRETER

Figure 1:
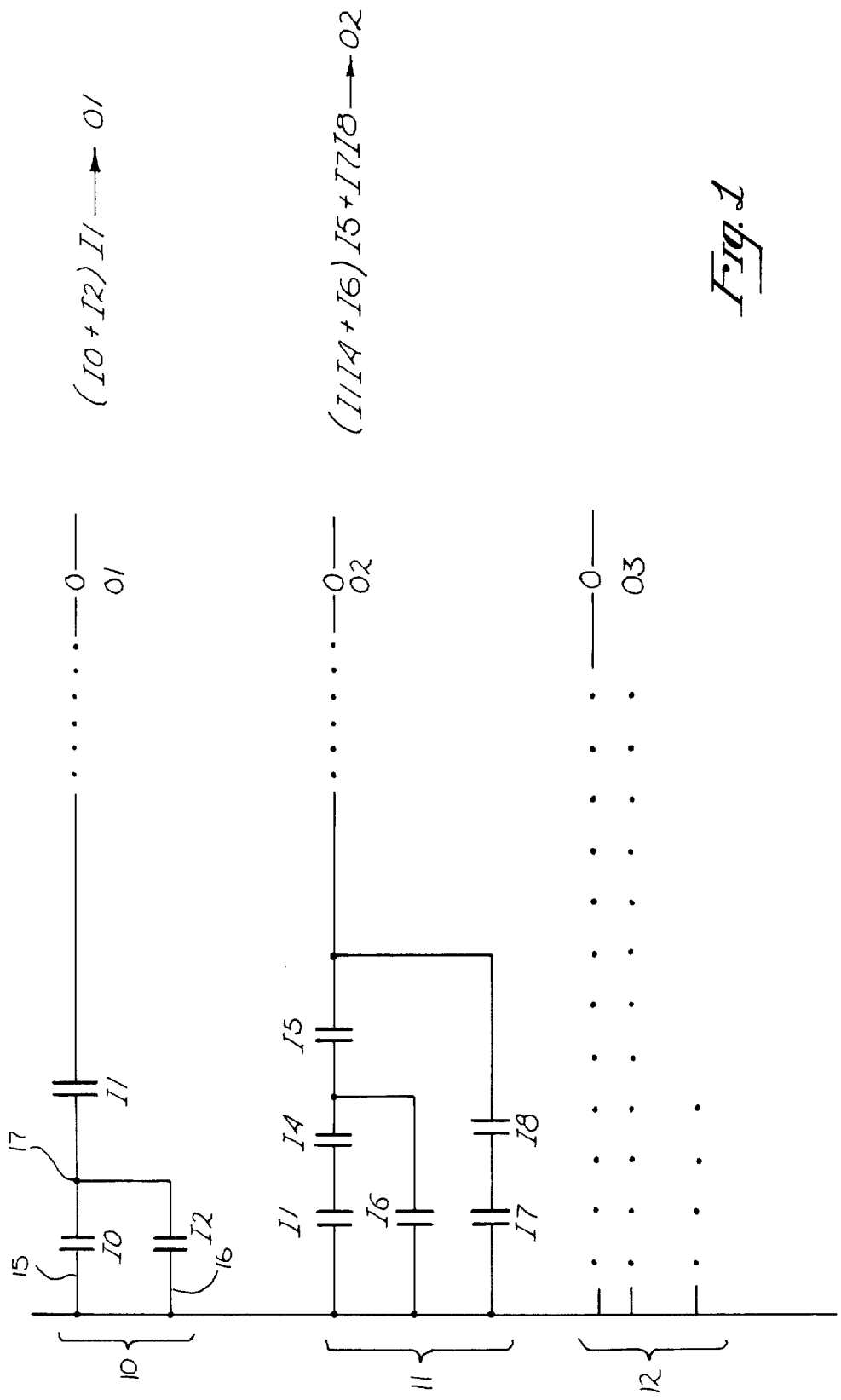
FIG. 1 is a diagram illustrating a partial ladder structure which includes a plurality of rungs.

A ladder such as commonly used in industrial control applications comprising partial rungs 10, 11 and 12 is shown in FIG. 1. Each rung includes a plurality of elements which can be located at different levels of the rung, such as levels 15 and 16 of rung 10. The elements such as I0 and I2 on levels 15 and 16, respectively, are connected at node 17. That is, branch elements (e.g., I2) can be connected into different levels and typically into a single, final level, thereby forming the rung. The values of the elements are examined and combined to determine the rung value, for instance, the action taken by an execution element. In a typical application, I0, I1, I2, etc., may be relay contacts, limit switches, etc., and the states of these components determine whether or not a coil of a relay, for example, is to be energized as represented by the action element or output device, 01.

To evaluate a rung with a commonly used prior art method, an independent cumulative account for each level is maintained as the elements are examined on all levels simultaneously from, for example, left to right of FIG. 1. The value of a level is its accumulated value combined with a current element's value. For instance, for rung 11 elements I1, I6 and I7 are each examined and their values noted. Next, I4 is examined and its value combined with I1 and similarly I8 is examined and its value combined with I7. Now, the value of level 1 is combined with the value of level 2, then the resulting value for level 1 is combined with the value for I5. Finally, the value for level 1 is combined with the value for level 3.

The source code for rung 10 of FIG. 1 with prior art techniques for evaluating rung 10 is of the form shown below:

SOURCE CODE

EXON I0
BRANCH
EXON I2
BRANCH
EXON I1
OUTPUT ON/OFF

This source code is stored in RAM and executed through use of an interpreter. For instance, EXON I0 would be decoded and cause a branch to a subroutine. The machine executable code for a 6809 processor is shown below to demonstrate the number of cycles required and this will permit comparison later in the application with the program compiled in accordance with the present invention. The following code is for purposes of explanation and represents a straightforward programming approach, not necessarily the most efficient solution.

required to store the program since it is stored in source code.

OVERVIEW OF COMPILER OF THE PRESENT INVENTION

With the compiler of the present invention, intelligence or logic is built-in to the compiled program thereby shortening the processing time. A program for evaluating a rung is compiled into machine executable code. The actual operation to be performed and all necessary parameters are contained in each element in a machine executable form. This eliminates the need for retrieval of encoded elements and the need for decoding of encoded elements into operand and operational code. As will be seen, true and false paths or other condition determining paths are built-in such that the value of the rung is simply the value of the last element evaluated. This eliminates the combining steps and additionally enables an examination of only those elements whose values must be known to determine the value of a rung.

Figure 2:
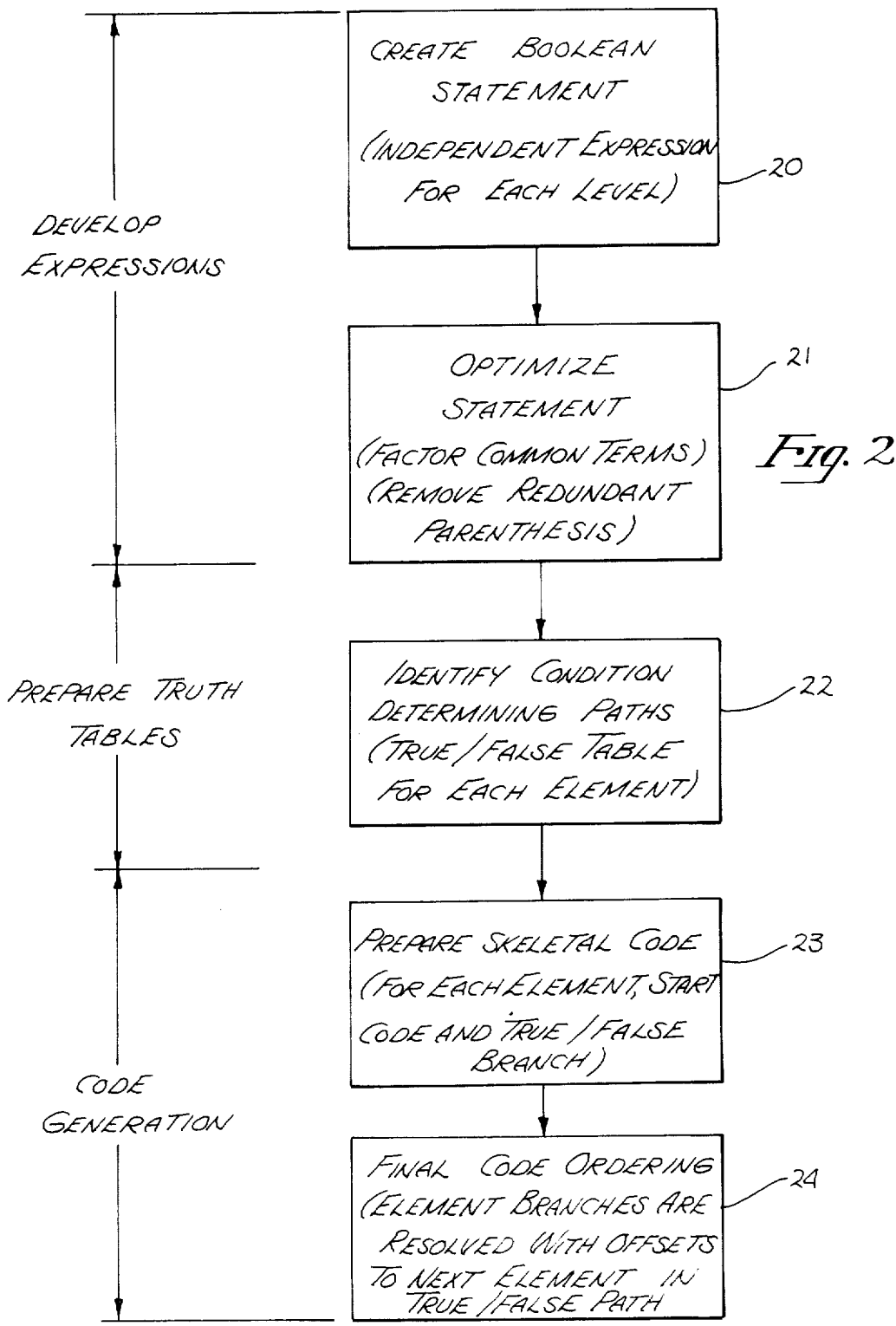
FIG. 2 is a flow diagram illustrating the steps used in compiling a program in accordance with the method of the present invention.

Referring to FIG. 2, the first step in preparibg a program with the present invention is the preparation of a

|  |  |  | CYCLES |
|---|---|---|---|
|  | READ NEXT INSTRUCTION SUBROUTINE | | |
| RNI | CLRA |  | 2 |
|  | LDB O, Y | ;GET OP CODE | 4 |
|  | ANDB #$FO |  | 2 |
|  | LSRB | ;SHIFT RIGHT 3 BIT POSN | 2 |
|  | LSRB |  | 2 |
|  | LSRB |  | 2 |
|  | ADDD #PTRTBL | ;ADD TO POINTER TABLE BASE | 4 |
|  | TFR D, X | ;POINTER ADDRESS TO X | 6 |
|  | LDX X | ;SUBROUTINE ADDRESS TO X | 5 |
|  | JSR X | ;EXECUTE INSTRUCTION | 7 |
|  | LEAY 2, Y | ;ADVANCE PROGRAM CTR. | 6 |
|  | RTS |  | 5 |
|  |  |  | 47 |
|  | EXAMINE ON SUBROUTINE | | |
| EXON00 | TST RUNG | ;RUNG STILL TRUE? | 7 |
|  | BEQ EXON03 | ;NO-QUIT | 3 |
|  | LDB L,Y | ;WORD ADDRESS TO B | 5 |
|  | CLRA |  | 2 |
|  | ADDD #RMBASE | ;ADD TO RAM BASE ADDRESS | 4 |
|  | TFR D,X | ;RAM ADDRESS TO X | 6 |
|  | LDA X | ;GET BYTE WITH DESIRED BIT | 4 |
|  | LDB #1 | ;MASK BIT TO WORKING REG. | 2 |
|  | STB WR1 |  | 5 |
|  | LDB Y | ;GET BIT ADDRESS | 4 |
|  | ANDB #$0E | ;MASK OUT OTHER BITS | 2 |
|  | LSRB | ;RIGHT JUSTIFY | 2 |
| EXON01 | DECB | ;MASK SHIFTED ENOUGH? | 2 |
|  | BMI EXON02 | ;YES | 3 |
|  | LSL WR1 | ;NO-SHIFT LEFT | 7 |
|  | BRA EXON01 | ;REPEAT TEST | 3 |
| EXON02 | ANDA WR1 | ;MASK OUT UNDESIRED BITS | 5 |
|  | BNE EXON03 | ;RUNG STILL TRUE | 3 |
|  | CLR RUNG | ;RUNG NOW FALSE | 7 |
| EXON03 | RTS |  | 5 |
|  |  |  | 81 |

Execution time of EXON is a function of the bit position of the desired bit, if the bit position is zero (right end of byte), 71 cycles are required; if the bit position is 7 (left end of byte), 176 cycles are required.

Thus to summarize this prior art method, each element is examined and the cumulative logical result of each level is maintained to determine the rung's output. To increase the speed at which rungs are evaluated, faster processes are utilized. This prior art method has the advantage of requiring a minimum of instructions, that is, not much random access memory (RAM) is Boolean expression or statement for each rung as represented by block 20. Examples of such expressions are described later in the application in conjunction with FIG. 1. Next, these statements can be optimized or simplified to reduce the amount of compilation. Simple mathematical operations are used to optimize the expressions as will be described. This step is represented by clock 21 of FIG. 2.

Now condition determining paths or control paths within the expressions are identified. For each element, the next element in the statement which determines the rung's output based on the condition of the current element is listed. For a Boolean expression, this requires the creation of true/false tables. These tables determine the branching used to shorten the computation time. This step is shown by block 22 in FIG. 2.

In the presently preferred embodiment, two passes are used to generate the machine executable code. Skeletal code is prepared for each element in a first pass which includes instructions for the examination of each element. In a second pass, relative offsets to these next elements are included permitting the program to follow the paths. This is shown as blocks 23 and 24 in FIG. 2.

CREATION AND SIMPLIFICATION OF BOOLEAN EXPRESSIONS

Before describing the Boolean expressions, the formatting used in the presently preferred embodiment should be noted. Each rung is treated as having up to three levels and a single output. Each level may have up to five elements across. This particular formatting was chosen since it is convenient for video displays. Moreover, it permits the establishment of conventions for compiling, for instance, fixed word widths for offsets. Where a rung is larger than 3×5 elements, it is broken into several rungs and special instructions are used to permit the continuing evaluation of a larger rung represented by several 3×5 rungs. By way of example, a "dummy" action element is used to permit the breaking up of larger rungs. This dummy element is placed at the end of a "subrung" and is treated as an ordinary element in the continued representation of the rung. In this manner, rungs of any size can be examined conveniently on a video display.

The Boolean expression for each rung is developed by maintaining independent expressions for each level of the rung (one column at a time) and by proceeding from left to right for the rungs shown in FIG. 1. The expressions for a level is the logical conjunction of its previous expression and the current element. The values of two levels connected together by a branch is the logical disjunction of the expressions for the two levels. These rules permit the mechanized creation of the Boolean expressions.

Referring to FIG. 1, the Boolean expression for rung 10 is shown to the right of the rung. I0 and I2 being at different levels are ORed (disjunctive) which is represented by I0+I2. This term is conjunctively combined with I1 to produce the total expression for the rung. Similarly for rung 11 the independent expression for the first level is combined with I6. This term is then combined with I5 and finally, the last branch comprising I7I8 is disjunctively combined. The condition of the elements, of course, determines whether or not the output 02 will be on or off. The expression for a given rung is the expression of the top level at the end of the processing, that is, for the given format at the end of the fifth element.

The expressions may be optimized for the invented method. Two forms of optimization are currently employed. Common terms may be factored. For instance, the expression ab+ac is converted to a(b+c). Also redundant parenthesis are removed. For instance, (a+(b+c) is converted to (a+b+c).

PREPARING CONDITION DETERMINING PATHS

The portion of the compilation represented by block 22 of FIG. 2 for the Boolean expressions consist of preparing a true/false table for the elements of the expression. The true path is determined such that if a current element has been determined to be true, other elements that are disjunctive from the element are ignored. In the expression a(b+c)d+e, the true path for the element b is element "d". The false path is determined by ignoring conjunctive elements when an element is false. For the expression a(b+c)d+e, the false path if element "a" is false is "e".

In effect, for the element under consideration (current element) the next elements in the expression which can determine the output of the rung based on the state of this current element is identified. These next elements point the way along the condition determining paths.

In FIG. 3, truth tables are set forth for the two expressions of FIG. 1 representing rungs 10 and 11. For example, for element I0, if this element is true, the disjunctive element I2 of the expression is ignored and the next element in the true path is I1. On the other hand, if I0 is false, there being no conjunctive element to ignore, the next element in the false path is the disjunctive element I2. Similarly, for I2 if the element is true, there being no disjunctive element to consider, the next element is I1. If I2 is false, the conjuctive element I1 is ignored and the rung itself is off, that is, false. if I1 is true, the rung itself is true and similarly, if it is false, the rung is off. The same logic when followed results in the table shown in FIG. 3 for rung 11.

When a numeric value is to be ANDed with a logical value, true is evaluated as ffff(hex) while false is evaluated as a zero. The value of both levels connected together by a branch element is the logical disjunctive of the two levels. The value of the rung is the value at the end of the processing. If a rung has a numerical value and its execution level requires a logical value, non zero is evaluated as true, while zero is evaluated as false.

As will be appreciated in the compiler itself, this step is easily implemented by testing for disjunctive and conjunctive terms and ignoring them for the true and false condition, respectively, and then identifying the next element for each of the paths.

GENERATING CODE

As mentioned, a two pass operation is used to generate the code. In the first pass, skeletal code (code with no operands) outlining the operation of each element is laid in place. All of the operands except the branches are filled in using the position of the elements operand in an input/output map. Then, for each element, the start of the code to execute the element and the position of the true and false branches to the next element for the current element's code are set out.

In the second pass, each element's branches are resolved by determining the relative offset from the element's true/false path to the next element along the path.

With the currently preferred formatting (i.e., 3×5 rungs), the following demonstrates these steps for rung 10 of FIG. 1. The ladder source is represented as follows:

| 1-0-0 | 1-0-1 | ... | 2-1-0 |
| 1-0-2 | 0-0-0 | ... | 0-0-0 |
| 0-0-0 | 0-0-0 | ... | 0-0-0 |

Where the first digit of each triplet represents the operation (0 being equal to no operation, 1 to "examine" on, and 2 to energize). The second digit represents the input/output word and the third digit represents the bit position within the word.

The skeletal code for this rung is sown in FIG. 4. Each of the instructions have been numbered for purposes of discussion. For element I0, the first instruction consists of loading register a with input word 0. Next, the bit 0 is tested with the immediate operand shown. The third instruction is a long branch if the bit is not equal (true condition for the test used). For element I0, the true path is a branch to I1 as may be seen from the first line of truth table for rung 10 (FIG. 3). On the second path, the relative offset to I1 is filled in for "xxxx" of instruction 3 since on the second pass the physical address for I1 will be determined. The fourth instruction is a long branch for the false path, that is, "xxxx" is replaced with the offset to I3. Similarly, the skeletal code for each element is developed as shown by instructions 1-12.

Also shown in FIG. 4 is the code to energize the output element assuming, for instance, that it is a relay. As shown by instruction 130, the output word 1 is loaded into accumulator "a" and an ORring operation is used to test bit 0 and store the result in accumulator "a."

Similarly, the instructions for a false rung (instructions 134-137) are set out in FIG. 4.

While the above discussion is based on a Boolean example, other expressions where condition determining paths are defined may be used. For instance, where each element is tested for "greater than", "less than", or "equal to ", three branches from this element along three condition determining paths would be used.

COMPILER FOR 6809 MICROPROCESSOR

Tables 1 and 2 are a compiler developed in accordance with the present invention for the 6809 microprocessor. The conventions discussed above are used for the compiler. Table 1 performs the steps represented by blocks 20 through 22 of FIG. 2. This program is written in the C programming language for execution on a Z-80 board computer. Table 2 contains the program for blocks 23 and 24 of FIG. 2; this program is written in 6809 assembly language.

OPERATION OF COMPILED PROGRAM

Referring to FIG. 5a, the rung 11 of FIG. 1 is redrawn. If a program is prepared as described above for determining the output of this rung, the program first tests the condition of I1. Assume that this input is true, then the offset for the LBNE instruction would next result in the examination of element I4 as indicated by line 27. If I4 is also true, the next element examined is I5 as indicated by line 28. Note with the program I6 is not examined since its condition will not effect the output of the rung if I1 and I4 are both true. Now if I5 is false, there is an offset to element I7 (line 30) and if that element is true, I8 is next examined. Finally, if I8 is true, the rung is true. If element I5 had been true, it would immediately be known that the rung is true as indicated by line 32 and no examination would occur of elements as indicated by line 32 and no examination would occur of elements I6, I7 or I8.

In FIG. 5b, rung 11 of FIG. 1 is again shown to provide additional examples. If I1 is false, there is an immediate branch to element I6. Element I4 is not examined since its condition cannot affect the output as long as I1 is false. Both the true path and false path from I6 are shown as lines 34 and 35, respectively. If I6 is true, I5 is next examined. If I5 is true, the rung is true. If I5 is false, the false path from I5 is shown in FIG. 5a as line 30. This leads to element I7. If I7 is false, the rung is false, and I8 is not examined. If I7 is true, then I8 is examined and its condition will determine the output of the rung.

It is important to note that in addition to not examining elements not effecting the output for given conditions, no cumulative rung condition is maintained. Rather, the last element examined determines the rung's condition.

COMPARISON WITH PRIOR ART TECHNIQUE

It is difficult to provide an exact comparison between the prior art technique for evaluating a ladder structure and that taught by the present invention. With the present invention, the number of instructions which are executed to evaluate a rung is not a constant as can be seen from FIGS. 5a and 5b. However, in general, it has been found that a speed increase of an order of magnitude is realized for complex rungs. The subroutines set forth earlier for "read next instruction" and "examine on" show the number of cycles required to perform these functions. It will be appreciated that by eliminating the need to examine all of the elements in the rung, considerable time saving is achieved.

Thus, by using the invented compiler faster determinations are made, or prior art execution speeds can be matched with less sophisticated processors. The present invention also permits the handling of more complex ladders with less computer "hardward". It should be noted that with the present invention more RAM storage is needed to store the object code program which results from the compiling. This is considered to be a worthwhile tradeoff since RAM is relatively inexpensive.

COMPUTER FOR EXECUTING PROGRAM PREPARED IN ACCORDANCE WITH THE PRESENT INVENTION

Figure 6:
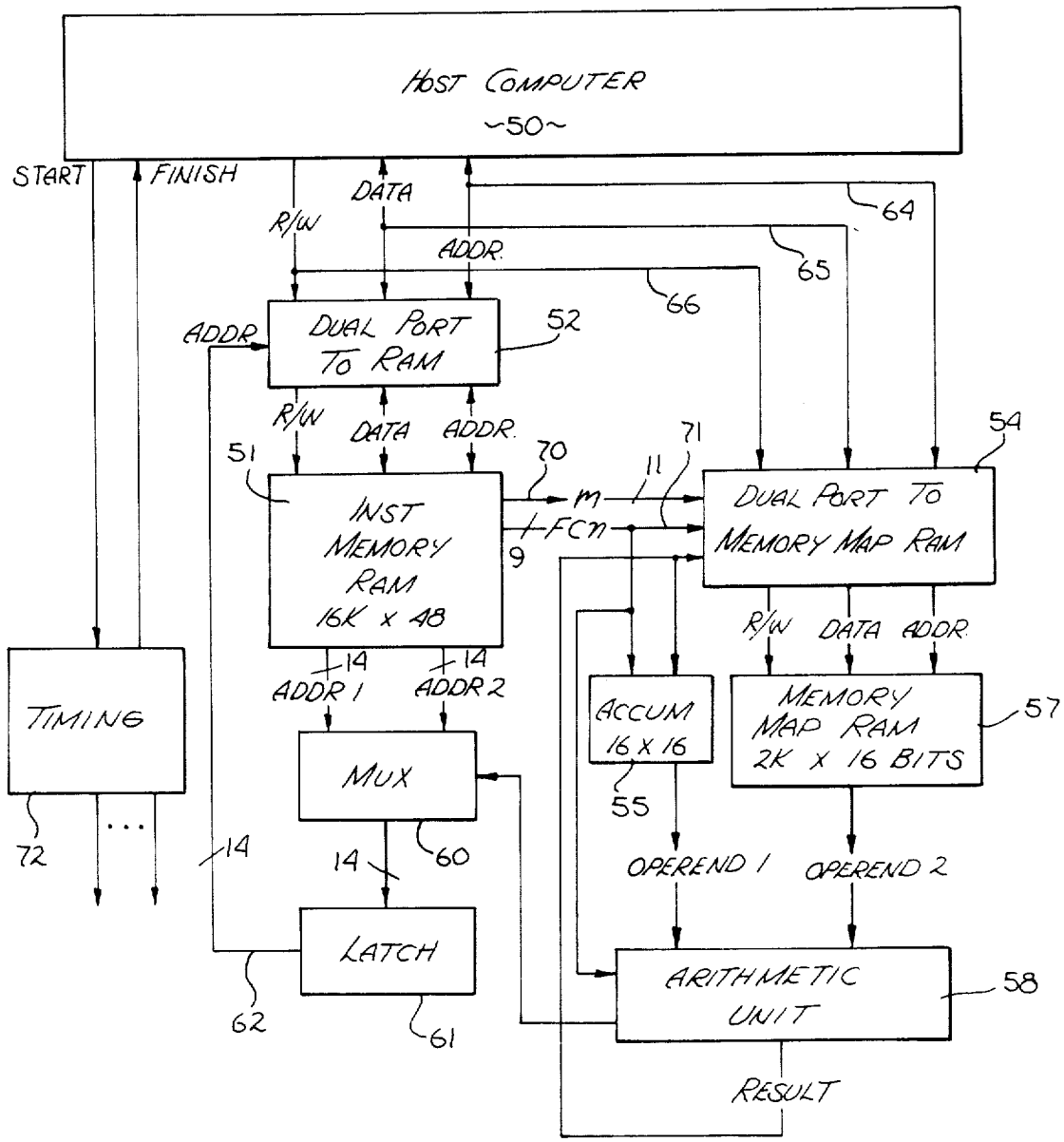
FIG. 6 is a block diagram of an invented computer particularly suited for executing code compiled in accordance with the present invention.

While any one of a plurality of microprocessors may be used for executing a program compiled with the present invention, particularly fast execution speed can be obtained with the architecture of FIG. 6.

A host computer 50 provides control functions for the invented computer. The host may include input-/output means for examining the conditions of the elements and energizing coils. The host may also load the compiled program into memory 51 and provide control signals for the invented computer through the timing means 72.

The invented computer includes an instruction memory, RAM 51. Object code instructions using the compiler described above are stored in memory 51 in a format which will be described below. In the presently preferred embodiment, RAM 51 is organized as a 16K×48 bit memory, each instruction being 48 bits wide. All addresses, input data and read/write signals are applied to memory 51 through the dual port means 52. The dual port means 52 communicates with the host computer 50 through the buses 64 and 65 and the read/write lines 66. These buses and lines are also coupled to a dual port means 54. This means communicates with a second memory, the map RAM 57. In the presently preferred embodiment, RAM 57 is organized as a 2K×16 memory.

Each instruction within memory 51 includes two 14 bit address fields. These address fields are coupled to a multiplexer 60. The output of the multiplexer 60 is coupled through a latch 61 and along bus 62 to provide an address for memory 51. An output from the arithmetic unit 58 controls the selection made by the multiplexer 60. Eleven bits of each instruction identified as "M" are coupled through bus 70 to the dual port means 54. These bits provide an address for addressing data within the RAM 57. Nine bits from the RAM 51 along bus 71 are coupled to the dual port memory 54, accumulator 55 and arithmetic unit 58.

An arithmetic unit 58 which may, for instance, be an ordinary ALU such as a 29116, receives a first field (operand 1) from accumulator 55 and a second field from RAM 57 (operand 2). The output of this arithmetic unit is coupled to the dual port means 54.

The entire memory of FIG. 6 may be fabricated using well-known, commerically available components.

Each instruction stored within the memory 51 is prepared, as mentioned, using the compiler described above. Each instruction includes 48 bits divided into four fields: FCN, 9 bits (function); M, 11 bits (memory address for RAM 57); address 1, 14 bits (branch address for true path); and, address 2, 14 bits (branch address for false path). The MUX 61 is in fact controlled by a flag. Address 1 is selected if the flag is set while address 2 is selected if the flag is not set. The functions, their description and the setting of this flag are set forth below:

Each instruction causes the execution of an arithmetic or logic function with one or two operands (one from accumulator 55 and the other from RAM 57) and for some instructions replaces the result into the accumulator 55, thus, permitting the result to be used as one of the operands. Each instruction includes the two branch addresses needed to access the next element, one along the true path and the other along the false path. Consider the following example:

| Fcn | M | Addr1 | Addr2 |
|---|---|---|---|
| 001000001 | 00000000010 | 00000000000100 | 00000000001000 |

The Fcn code specifies an AND operation between the contents of address 00000000010 of the RAM 54 and accumulator 55 contents 0001. If the result of the AND operation is non-zero then address 1 contains the next instruction executed; otherwise, address 2 contains the next instruction.

It is apparent from the above that the invented computer performs in parallel the operations performed serially for code such as shown in FIG. 4. The speed of execution then becomes limited only by the access time particularly for the RAM 51.

| Fcn | Function | Description | Flag |
|---|---|---|---|
| 00000XXXX | NOP | | No Operation |
| 00001XXXX | CLR | 0 → M | Set if M originally < > 0 |
| 00010aaaa | LDA | (M) → A | Set if (M) < > 0 |
| 00011aaaa | STA | A → M | Set if A < > 0 |
| 00100aaaa | AND | (M) and A → M | Set if Result < > 0 |
| 00101aaaa | OR | (M) or A → M | Set if Result < > 0 |
| 00110aaaa | XOR | (M) xor A → M | Set if Result < > 0 |
| 00111XXXX | INC | (M) + 1 → M | Set if Overflow |
| 01000XXXX | DEC | (M) − 1 → M | Set if Underflow |
| 01001aaaa | ADD | (M) + 1 → M | Set if Overflow |
| 01010aaaa | MUL | (M) * A → M | Set if Overflow (x8x) MUL) |
| 01011XXXX | TST | Test Word in (M) | Set if (M) < > 0 |
| 01100aaaa | CMP | Compare (M) to A | Set if (M) > A |
| 10000bbbb | AND B | And Bit B in (M) | Set if B originally set |
| 10001bbbb | OR B | Or Bit B in (M) | Set if B originally set |
| 10010bbbb | XOR B | Xor Bit B in (M) | Set if B originally set |
| 10011bbbb | TST B | Test Bit B in (M) | Set if B set |
| 11111XXXX | HALT | | | aaaa = binary code of accumulator (one of sixteen)
bbbb = position of Bit B (one of sixteen)
XXXX = "don't care"

In operation, as mentioned, the host computer 50 loads the compile object code program into the RAM 51. In the beginning of each scan cycle, the host updates the input status portion of RAM 57 through the dual port means 54. On signal from the host computer 50, the program in RAM 51 is executed. The timing means 72 monitors the function codes on bus 72 to generate a finish signal for the host computer.

Thus, a method for compiling a program which is particularly useful for evaluating a ladder structure has been described. Conditioning determined paths such as true/false paths are identified through the expressions and determine the branching for the object code program. Also described is a high speed special purpose processor optimized for executing the object code compiled in accordance with the present invention.

```
/*----------------------------------------------------------------*/
/* compile ladder source from contactor.rung[].element into true/false arcs */
/* addand & orproc translate ladder to boolean string,          */
/* bool2tree translates boolean string to arcs.                 */
/*----------------------------------------------------------------*/ include "stdio.h"
include "dep.h"
#include "tar.h"
```

```
#define     EL_MAX      16
#define     COIL_EL     15
#define     ILLEGAL     17
#define     ENDARC      0x00ff
#define     TST_MASK    0xf800
#define     BRN_MASK    0x0400
#define     VOID        0x0000
define     PATH        0x1800 define     TBL_TOP     2*DSP_COLUMNS
define     STG_SIZE    200 static struct nodedef {
        char id;
        int arct;
        int arcf;
};

static int pil, sol;

static int src[EL_MAX];
static char bool0stg[200];
static char bool1stg[200];
static char bool2stg[200];
static char *boolstg[VERT_MAX] = {
        bool0stg,
        bool1stg,
        bool2stg
};
/*-----------------------------------------------------------------*/
/*                                                                 */
/*                                                                 */
/*                                                                 */
/*-----------------------------------------------------------------*/ ldrcmp()
{
        char c;
        int timer, rng, elem;
        struct tmr_info *t;

set_stat(COMPILE);
        for (timer = 1; timer <= SYSTEM_MAX; timer++)
                for (rng = 0; rng < RUNG_MAX; rng++) {
                        t = select(timer);
                        if (t->rung[rng].rev_level != t->rung[rng].edit_level) {
                                for (elem = 0; elem < EL_MAX; elem++)
                                        src[elem] = t->rung[rng].element[elem];
                                release(timer);
                                docomp(timer, rng);
                        }
                        else
                                release(timer);
                }
        clr_stat(COMPILE);
}
```

```
docomp(timer, rng)
int timer, rng;
{
        int elem, col, row, numtst, count;
        struct nodedef node[2 * EL_MAX];
        struct tmr_info *t;

for (row = 0; row < VERT_MAX; row++) {
                *boolstg[row] = 'T';
                *(boolstg[row] + 1) = NULL;
        }
        elem = 0;
        for (col = 0; col < HORZ_MAX; col++) {
                for (row = 0; row < VERT_MAX; row++, elem++)
                        if (has_tst(elem))
                                addand(boolstg[row], elem);
                        else if (has_void(elem))
                                *(boolstg[row]) = NULL;
                orproc(col);
        }
        numtst = bool2tree(boolOstg, node);
        t = select(timer);
        t->rung[rng].objcount = numtst;
        for (count = 0; count < numtst; count++) {
                t->rung[rng].truearc[count] = node[count].arct;
                t->rung[rng].falsearc[count] = node[count].arcf;
                t->rung[rng].syllabus[count] = node[count].id;
        }
        t->rung[rng].rev_level = t->rung[rng].edit_level;
        release(timer);
}
addand(stgpt, elem)
char *stgpt;
int elem;
{
        if (*stgpt == 'T') {
                *stgpt++ = 'a' + elem;
                *stgpt = NULL;
                return(TRUE);
        }
        else if (*stgpt) {
                while (*stgpt)
                        stgpt++;
                *stgpt++ = 'a' + elem;
                *stgpt = NULL;
                return(TRUE);
        }
        else
                return(FALSE);
}
/*----------------------------------------------------------------------*/
/* combine (or together) boolean strings of levels connected by branches. */
/* determines which strings to or together and what order.              */
/* strings with common elements or'ed first, to maintain easy factorability */
/*----------------------------------------------------------------------*/ orproc(col)
```

```
int col;
{
    int elem, brn1flag, brn2flag;
    char tmpastg[200], tmpbstg[200];

elem = col * VERT_MAX;
    brn1flag = (has_rtbrn(elem)) ? TRUE : FALSE;
    brn2flag = (has_rtbrn(elem + 1)) ? TRUE : FALSE;
    if (brn1flag && brn2flag) {
        if (startsame(bool0stg, bool1stg)) {
            combine(bool0stg, bool1stg, tmpastg);
            combine(tmpastg, bool2stg, tmpbstg);
        }
        else if (startsame(bool1stg, bool2stg)) {
            combine(bool1stg, bool2stg, tmpastg);
            combine(bool0stg, tmpastg, tmpbstg);
        }
        else if (startsame(bool0stg, bool2stg)) {
            combine(bool0stg, bool2stg, tmpastg);
            combine(tmpastg, bool1stg, tmpbstg);
        }
        else {
            combine(bool0stg, bool1stg, tmpastg);
            combine(tmpastg, bool2stg, tmpbstg);
        }
        copy(tmpbstg, bool0stg);
        copy(tmpbstg, bool1stg);
        copy(tmpbstg, bool2stg);
    }
    else if (brn1flag) {
        combine(bool0stg, bool1stg, tmpastg);
        copy(tmpastg, bool0stg);
        copy(tmpastg, bool1stg);
    }
    else if (brn2flag) {
        combine(bool1stg, bool2stg, tmpastg);
        copy(tmpastg, bool1stg);
        copy(tmpastg, bool2stg);
    }
}
/*---------------------------------------------------------------*/
/* combine (or together) stga and stgb, put resultant string in stgc. */
/* factors out common terms in begin of string.                  */
/* ex: will copy stga of ab and stgb of ac into stgc of a(b+c).  */
/*---------------------------------------------------------------*/ combine(stga, stgb, stgc)
char *stga, *stgb, *stgc;
{
    char c, tmporstg[50], *tmporpt, *orgstgc;
    int factor, t;

*(orgstgc = stgc) = NULL;
    if (*stga == 'T' || *stgb == 'T') {
        *stgc++ = 'T';
        *stgc = NULL;
        return(FALSE);
    }
```

```
        else {
                factor = startsame(stga, stgb);
                for (t = 0; t < factor; t++)
                        *stgc++ = *stga++, *stgb++;
        }
        if (*stga == NULL) {
                if (*stgb == '+' || stgc == orgstgc)
                        while (c = *stgb++)
                                *stgc++ = c;
                *stgc = NULL;
                return(FALSE);
        }
        else if (*stgb == NULL) {
                if (*stga == '+' || stgc == orgstgc)
                        while (c = *stga++)
                                *stgc++ = c;
                *stgc = NULL;
                return(FALSE);
        }
        else {
                tmporpt = tmporstg;
                *tmporpt++ = '(';
                while (c = *stga++)
                        *tmporpt++ = c;
                *tmporpt++ = '+';
                while (c = *stgb++)
                        *tmporpt++ = c;
                *tmporpt++ = ')';
                *tmporpt = NULL;
                optomize(tmporstg, stgc);
                return(TRUE);
        }
}
/*----------------------------------------------------------------*/
/* optomize a disjunct condition                                  */
/* copies string instg into outstg removing parens in associative or's. */
/* ex: will copy instg of (a+(b+c)) into outstg of (a+b+c). trashes instg.*/
/*----------------------------------------------------------------*/ optomize(instg, outstg)
char *instg, *outstg;
{
        int depth, del[20];
        char *stpt[20], *svpt, *svin;
        char c, lstc, nxtc;

svin = instg;
        depth = 0;
        c = NULL;
        do {
                lstc = c;
                c = *(svpt = instg++);
                nxtc = *instg;
                if (c == '(') {
                        stpt[++depth] = svpt;
                        del[depth] = (lstc == '+' || lstc == '(') ? TRUE : FALSE;
```

```
                }
                else if (c == ')') {
                        if ((nxtc == '+' || nxtc == ')') && del[depth])
                                *stpt[depth] = *svpt = 'X';
                        depth--;
                }
        } while (depth != 0);
        while (c = *svin++)
                if (c != 'X')
                        *outstg++ = c;
        *outstg = NULL;
}
/*--------------------------------------------------------------------*/
/* determine number of chars in stga & stgb can be factored. ie. don't */
/* include NULL or partial disjunct terms.                             */
/* ex: will return 2 for stga = a+(b+c)d, stgb = a+(b+ce)f.            */
/*--------------------------------------------------------------------*/
startsame(stga, stgb)
char *stga, *stgb;
{
        int depth, cnt;
        char *svstga;

svstga = stga;
        cnt = depth = 0;
        while (*stga == *stgb && *stga != NULL) {
                if (*stga == '(')
                        depth++;
                else if (*stga == ')')
                        depth--;
                if(depth == 0)
                        cnt = stga - svstga + 1;
                stga++;
                stgb++;
        }
        return(cnt);
} copy(stga, stgb)
char *stga, *stgb;
{
        while (*stgb++ = *stga++)
                ;
} has_pth(elem)
int elem;
{
        if (elem == ILLEGAL)
                return(FALSE);
        else
                return(((src[elem] & TST_MASK) == PATH) ? TRUE : FALSE);
}
```

```
has_rtbrn(elem)
int elem;
{
        if (elem == ILLEGAL)
                return(FALSE);
        else
                return(((src[elem] & BRN_MASK) == BRN_MASK) ? TRUE : FALSE);
}
has_tst(elem)
int elem;
{
        if (elem == ILLEGAL)
                return(FALSE);
        else
                return((((src[elem] & TST_MASK) != VOID) && ((src[elem] & TST_MASK) != PATH)) ? TRUE :
                    FALSE);
} has_void(elem)
int elem;
{
        return(((src[elem] & TST_MASK) == VOID) ? TRUE : FALSE);
} bool_print(stg)
char *stg;
{
        dspcpy(TBL_TOP, stg);
}
/*----------------------------------------------------------------------*/
/* boolean to tree like thing converter.                                */
/* returns number of elements in syllabus.                              */
/*                                                                      */
/*----------------------------------------------------------------------*/ bool2tree(stgpt, node)
char *stgpt;
struct nodedef *node;
{
        int testno, numtst, t;
        char *orgstg, c;
        int off2num[STG_SIZE];

orgstg = stgpt;
        numtst = makstgdata(orgstg, off2num, node);
        testno = 0;
        while (c = *stgpt++) {
                if (isalpha(c)) {
                        node[testno].arct = find_true(orgstg, stgpt, off2num);
                        node[testno].arcf = find_false(orgstg, stgpt, off2num);
                        testno++;
                }
        }
        return(numtst);
}
```

```
/*-------------------------------------------------------------------*/
/* collect data for this string, array off2num is conversion table from */
/* string offset to test number, also sets some info for nodes.         */
/* returns number of elements in syllabus (including pil & sol)         */
/*-------------------------------------------------------------------*/ makstgdata(stg, off2num, node)
char *stg;
int *off2num;
struct nodedef *node;
{
        char *orgstg, c;
        int tstno, numtst;

tstno = 0;
        orgstg = stg;
        while (c = *stg) {
                if (isalpha(c)) {
                        off2num[stg - orgstg] = tstno;
                        node[tstno].id = c;
                        tstno++;
                }
                stg++;
        }
        if ((has_tst(COIL_EL)) && (tstno > 0)) {
                pil = tstno;
                sol = tstno + 1;
                numtst = tstno + 2;
        }
        else if (has_tst(COIL_EL)) {
                sol = tstno;
                pil = tstno + 1;
                numtst = tstno + 1;
        }
        else
                pil = sol = numtst = 0;
        node[pil].id = 'T';
        node[sol].id = 'F';
        node[pil].arct = node[pil].arcf = node[sol].arct = node[sol].arcf = ENDARC;
        return(numtst);
}
/*-------------------------------------------------------------------*/
/* return number of test to go to if test preceeding *stgpt is true.    */
/* off2num is conversion array of test offsets (from start of string) to */
/* test number.                                                         */
/*-------------------------------------------------------------------*/
find_true(start, stgpt, off2num)
char *start, *stgpt;
int *off2num;
{
        while (!isalpha(*stgpt)) {
                if (*stgpt == NULL)
                        return(pil);
                else if (*stgpt == '+')
                        stgpt = quitor(stgpt, 1);
                else
                        stgpt++;
```

```
        }
            return(off2num[stgpt - start]);
}

/*------------------------------------------------------------------*/
/* return number of test to go to if test preceeding *stgpt is false  */
/* off2num is conversion array of test offsets (from start of string) to */
/* test number.                                                     */
/*------------------------------------------------------------------*/ find_false(start, stgpt, off2num)
char *start, *stgpt;
int *off2num;
{
        while (*stgpt != '+') {
                if (*stgpt == NULL)
                        break;
                else if (*stgpt == '(')
                        stgpt = quitor(stgpt, 0);
                else
                        stgpt++;
        }
        while (!isalpha(*stgpt))
                if (*stgpt == NULL)
                        return(sol);
                else
                        ++stgpt;
        return(off2num[stgpt - start]);
}
/*------------------------------------------------------------------*/
/* jump out (through) 'depth' levels of parentheses. if depth = 0 will  */
/* skip parens at stgpt, if depth = 1 will skip to end of current parens. */
/*------------------------------------------------------------------*/ quitor(stgpt, depth)
char *stgpt;
int depth;
{
        do {
                if (*stgpt == NULL)
                        break;
                else if (*stgpt == ')')
                        depth--;
                else if (*stgpt == '(')
                        depth++;
                stgpt++;
        } while (depth != 0)
        return(stgpt);
}
```

TABLE 2

```
;
;
;LADDER EQUATES
;---------------------------------
ASGMAX          EQU     $0B             ;NUMBER OF TIMER IO ASSIGNMENTS
```

```
INMASK      EQU     $01
OUTMASK     EQU     $02
FLAGMASK    EQU     $04
IOSIZE      EQU     $65             ;SIZE OF IOMEMORY
WRDSIZE     EQU     $C9             ;SIZE OF WORD MEMORY
BIGESTOBJ   EQU     $12             ;SIZE OF LARGEST COMPILED INSTR
SRCELMAX    EQU     $10             ;NUM OF SOURCE ELEMENTS
OBJELMAX    EQU     $11             ;2 COIL ELEMENTS IN OBJECT CODE
LASTSRCEL   EQU     $0F
RUNGMAX     EQU     $10
ENDARC      EQU     $FF             ;DEF CODE FOR ARC TO NEXT RUNG
SRCELSIZE   EQU     2               ;INSTR. OPCODE, OPERAND
SRCRGSIZE   EQU     SRCELMAX*SRCELSIZE  ;SIZE OF A RUNG
LSCODEOFF   EQU     $00             ;OFFSETS WITHIN LADDER STRUCTURES
LSLENOFF    EQU     $02
LSWD1OFF    EQU     $03             ;DIST FROM BEGIN OF ELEM TO WORD1, WORD2, BYTE
LSWD2OFF    EQU     $04             ;$FF IF OPERAND DOESN'T EXIST
LSWD3OFF    EQU     $05             ;WORD 1 & WORD 2 ARE IN IOMEMORY
LSWD4OFF    EQU     $06             ;WORD 3 & WORD 4 ARE IN WORD MEMORY
LSWD5OFF    EQU     $07
LSBY1OFF    EQU     $08             ;WORD 5 IS A CONSTANT
LSBY2OFF    EQU     $09
LSTBROFF    EQU     $0A
LSFBROFF    EQU     $0B
LSNOP       EQU     $FF
REHLOUT     EQU     99
MEHLOUT     EQU     99
ROBLIN      EQU     99
;
;
;
;
;
;LADDER VARIABLES
;----------------------------------------
CDATAOFF    DS      2               ;COMPILER VARS
CSTRUC      DS      2
COBJMARK    DS      2
COBJEND     DS      2
CELCNT      DS      1
CWD1        DS      2
CWD2        DS      2
CWD3        DS      2
CWD4        DS      2
CWD5        DS      2
CBY1        DS      1
CBY2        DS      1
CTBRTBL     DS      OBJELMAX * 2
CFBRTBL     DS      OBJELMAX * 2
CADRTBL     DS      OBJELMAX * 2
;
LMOBJSTART  DS      2               ;LADDER MANAGER VAR'S
LMOBJEND    DS      2
LMOBJSIZE   DS      2
LMTEMPOBJ   DS      OBJELMAX * BIGESTOBJ
LMTEMPSIZE  DS      2
LMTEMPEND   DS      2
```

```
LMRNGADR        DS      RUNGMAX*2
LMCOMFREQ       DS      RUNGMAX
LMRNGX1         DS      1
LMRNGX2         DS      1
LMLDREND        DS      2
;
WELDINIT        DS                      ;MISC LADDER VARS
SCHEDSEL        DS      1
LDRMOUTS        DS      2
IOISDONE        DS      1
;

IOMEMORY        DS      IOSIZE          ;LADDER IO MEMORY
WRDMEMORY       DS      WRDSIZE         ;LADDER WORD MEMORY
LDRACCUM        DS      2               ;LADDER ACCUMULATOR.
LDRENBL         DS      1               ;FLAG LADDER IS EXECUTABLE.
LDROBJMEM       DS      $1FFF - $       ;COMPILED LADDER GOES HERE
LDROBJEND       EQU     $
;
;
;
;
;INITIALIZE THE LADDER
;
                LDX     #LMRNGADR       ;INIT ALL LADDER RUNGS TO NULL
RESLDR          LDD     #LDROBJMEM
                STD     ,X++
                CMPX    #LMRNGADR+(RUNGMAX*2)
                BCS     RESLDR
                STD     LMLDREND
                LDX     #LMCOMFREQ      ;REQUEST COMPILER FOR ALL RUNGS
                LDB     #RUNGMAX
                LDA     #$AA
                JSR     FILL
;
;
;
;
;UPDATE INPUTS EVERY CYCLE (OR MORE OFTEN IF HARDWARE PERMITS)
;
                JSR     POSTINS         ;PARTINS TO MINS WITH DEBOUNCE
                LDA     #$AA
                STA     IOISDONE        ;ENABLE LADDER EXECUTION

;
;
;
;
;THESE ROUTINES COMMUNICATE LADDER INFORMATION TO A DATA ENTRY PANEL
;LADDER POLL
;
POLLA0          LDA     RBUFFER+COMMUNEXT
                JSR     XTOLDRDATA
                TFR     X,Y
                JSR     LOADHEADER      ;Y IS OK
                LDA     ,Y+
                STA     ,X+             ;REV LEV
```

```
                LDA     #OBJELMAX*2
                JSR     MOVECNT         ;T/F ARCS
                LDA     ,Y+
                STA     ,X+             ;LDROBJCOUNT
                LDA     #OBJELMAX
                JSR     MOVECNT         ;LDRSYLLABUS
                LDA     ,Y+
                STA     ,X+             ;EDIT LEV
                LDA     #SRCELMAX
                JSR     FMOVE           ;LADDER SOURCE (Z80 FORM)
                JSR     LOADTRAILER
                RTS
;
;LADDER SELECT
;
SELA0           LDA     RBUFFER+COMMUNEXT
                STA     COMMRNG
                JSR     XTOLDRDATA
                LDY     #RBUFFER+COMMUNTXT
                LDA     ,Y+             ;REV LEVEL
                STA     ,X+
                LDA     #OBJELMAX*2
                JSR     MOVECNT         ;T/F ARCS
                LDA     ,Y+
                STA     ,X+             ;LDR OBJCOUNT
                LDA     #OBJELMAX
                JSR     MOVECNT         ;LDRSYLLABUS
                LDA     ,Y+
                STA     ,X+             ;EDIT LEVEL
                LDA     #SRCELMAX
                JSR     FMOVE           ;LADDER SOURCE
                LDA     #$AA            ;REQUEST THAT THIS RUNG BE COMPILED
                LDB     COMMRNG
                LDX     #LMCOMPREQ
                STA     B,X
                JSR     SRESPOND
SELA0X          RTS
;
;
;
;
;
;COMMUNICATION SUBROUTINES
;
;
;SET X TO POINT TO SOURCE DATA FOR RUNG IN A
;
XTOLDRDATA      LDB     #LDRDATASIZE
                MUL
                LDX     #LDRLEV
                LEAX    D,X
                RTS
;
;
;
;
```

LADDER COMPILER AND OBJECT MEMORY MANAGER
;--------------------------------------------------------------------------------
;
;LADDER EXECUTER
;
```
LDREXECUTE      JSR     MINSTOLINS
                TST     LDRENBL         ;IF NOT ENABLED, QUIT
                BEQ     LDREXECX
                TST     IOISDONE        ;IF LAST IO NOT OUFUT (ET,
                BEQ     LDREXECX        ;DELAY LADDER EXECUTION.
                JSR     LTOMOUTS
                CLR     IOISDONE
                JSR     LDROBJMEM
LDREXECX        RTS
;
;
;
;COPY MINS TO LADDER IOMEMORY (LINS)
;
MINSTOLINS      LDX     #IOMEMORY
                LDB     MINS+1
MINSTO1         CMPX    #IOMEMORY+$08
                BEQ     MINSTO3
                LSRB
                BCC     MINSTO2
                LDA     #INMASK
                ORA     ,X              ;SET LINS
                STA     ,X+
                BRA     MINSTO1
MINSTO2         LDA     #NOT INMASK     ;CLEAR LINS
                ANDA    ,X
                STA     ,X+
                BRA     MINSTO1
MINSTO3         LDA     MINS            ;X IS IOMEMORY+8
MINSTO4         CMPX    #IOMEMORY+$10
                BEQ     MINSTOX
                LSRA
                BCC     MINSTO5
                LDB     #INMASK
                ORB     ,X              ;SET LINS
                STB     ,X+
                BRA     MINSTO4
MINSTO5         LDB     #NOT INMASK     ;CLEAR LINS
                ANDB    ,X
                STB     ,X+
                BRA     MINSTO4
MINSTOX         RTS
;
;
;COPY LADDER IOMEMORY (LOUTS) TO MOUTS
;
LTOMOUTS        LDX     #IOMEMORY
                LDA     #OUTMASK
LOUTSTO1        CMPX    #IOMEMORY+$10
                BEQ     LOUTSTOX
                BITA    ,X+
                BEQ     LOUTSTO2
```

```
                ORCC    #CCCARRY        ;SET MOUTS
                ROR     LDRMOUTS
                ROR     LDRMOUTS+1
                BRA     LOUTST01
LOUTST02        ANDCC   #NOT CCCARRY    ;CLEAR MOUTS
                ROR     LDRMOUTS
                ROR     LDRMOUTS+1
                BRA     LOUTST01
LOUTSTOX        LDD     LDRMOUTS
                STD     MOUTS
                RTS
;
;
;
;
;LADDER OBJECT SPACE MANAGER
;
LMANAGER        LDX     #LMCOMPREQ
                CLRA
LMCHK           TST     ,X
                BNE     LMCOMPILE       ;COMPILE ONE RUNG THEN EXIT
                LEAX    1,X
                INCA
                CMPA    #RUNGMAX
                BCS     LMCHK
                TST     LDRENBL         ;NOTHING TO COMPILE,
                LBNE    LMEXIT          ;IF ALREADY ENABLED EXIT.
                LDD     ERRCONTROL
                PSHS    D               ;COMPILED BUT NOT ENABLED YET,
                LDD     #$00            ;CLEAR IOMEMORY THEN ENABLE AND EXIT.
                STD     ERRCONTROL      ;DISABLE ERRORS WHILE IO BEING CLEARED
                LDX     #IOMEMORY
                LDB     #IOSIZE
                CLRA
                JSR     FILL
                JSR     MINSTOLINS
                PULS    D
                STD     ERRCONTROL
                LDA     #$AA
                STA     LDRENBL
                LBRA    LMEXIT
LMCOMPILE       CLR     ,X
                CLR     LDRENBL
                JSR     SETLMVARS       ;SET OBJSTART, OBJSIZE, ETC (FROM A)
                LDA     LMRNGX1
                LDX     #LMTEMPOBJ
                JSR     COMPILE         ;END OF RUNG IN X
                STX     LMTEMPEND
                TFR     X,D
                SUBD    #LMTEMPOBJ
                STD     LMTEMPSIZE      ;SIZE OF NEW RUNG
                LDY     LMOBJEND        ;ERASE OLD RUNG
                LDX     LMOBJSTART
LMERASE         CMPY    LMLDREND        ;DON'T MOVE END OF LADDER (RTS)
                BCC     LMERASEX
                LDA     ,Y+
                STA     ,X+
```

```
                BRA     LMERASE
LMERASEX        TFR     X,Y             ;NEW END OF LADDER DATA (RTS ADR) IN Y
                LDD     LMTEMPSIZE      ;MAKE ROOM FOR NEW RUNG
                LEAX    D,X             ;NEW END OF LADDER (RTS ADR) IN X
LMROOM          CMPY    LMOBJSTART
                BCS     LMROOMX         ;MOVE ALL FROM RTS ADR. TO START INCLUSIVE
                LDA     ,Y
                STA     ,X
                LEAY    -1,Y
                LEAX    -1,X
                BRA     LMROOM
LMROOMX         LDY     #LMTEMPOBJ      ;STORE NEW RUNG
                LDX     LMOBJSTART
LMSTORE         LDA     ,Y+
                STA     ,X+
                CMPY    LMTEMPEND       ;DONT SAVE RTS ADR. OF NEW RUNG
                BCS     LMSTORE
                LDX     #LMRNGADR       ;ADJUST ALL RUNG ADDRESSES
                LDB     LMRNGX2         ;PAST THIS ONE
                ADDB    #$02
                ABX
LMADJUST        CMPX    #LMRNGADR+(RUNGMAX*2)
                BCC     LMFIXEND
                LDD     ,X
                SUBD    LMOBJSIZE
                ADDD    LMTEMPSIZE
                STD     ,X++
                BRA     LMADJUST
LMFIXEND        LDD     LMLDREND
                SUBD    LMOBJSIZE
                ADDD    LMTEMPSIZE
                STD     LMLDREND
                LDA     #$39            ;STORE RTS AFTER LADDER
                STA     [LMLDREND]
LMEXIT          RTS
;
;
;SET LADDER MANAGER VARIABLES, RUNG NUMBER IS IN A
;STORES TO LMTARC, LMFARC, LMSRC, LMOBJSTART, LMOBJEND, LMLDREND
;
SETLMVARS       STA     LMRNGX1
                TFR     A,B
                ASLB
                STB     LMRNGX2
                LDX     #LMRNGADR
                LDD     B,X
                STD     LMOBJSTART
                LDB     LMRNGX2
                ADDB    #$02
                CMPB    #RUNGMAX*2      ;PAST END OF TABLE
                BEQ     SETLMLAST
                LDD     B,X
                BRA     SETLMCONT
SETLMLAST       LDD     LMLDREND
SETLMCONT       STD     LMOBJEND
                LDD     LMOBJEND
                SUBD    LMOBJSTART
```

```
                STD     LMOBJSIZE
                RTS
;
;
;COMPILE FUNC IN A INTO EXECUTABLE CODE AT X.
;ON RETURN X PTS TO NEXT FREE BYTE
;
COMPILE         LDB     #LDRDATASIZE
                MUL
                STD     CDATAOFF
                STX     COBJMARK
                STX     COBJEND
                CLR     CELCNT          ;START EL COUNT = 0
;
;LAY IN SKELETON CODE
;
COMPA0          LDA     CELCNT
                LDX     CDATAOFF
                CMPA    LDROBJCOUNT,X
                LBCC    COMPBRANCH      ;DONE WITH FIRST PASS
                JSR     CELTOCSTRUC     ;Y PTS TO STRUC FOR EL CELCNT
                LDX     COBJMARK
                LDY     CSTRUC
                LDA     LSLENOFF,Y      ;NULL ELEMENT, SKIP CODE AND OPERAND
                LBEQ    COMPC0          ;GENERATION, (BUT SAVE ADDRESS)
                LDY     LSCODEOFF,Y
                JSR     MOVECNT         ;X PTS TO END OF EL
                STX     COBJEND
;
;LAY IN OPERANDS (WD1, WD2, WD3, WD4, WD5, BY1, BY2)
;
COMPB0          JSR     MKOPERANDS      ;FILLS CWD1, CWD2, CBY1, CBY2
                LDY     CSTRUC
                LDB     LSBY1OFF,Y      ;CHK FOR BY1 OPERAND
                CMPB    #LSNOP
                BEQ     COMPB1
                LDX     COBJMARK
                LDA     CBY1
                STA     B,X
COMPB1          LDB     LSBY2OFF,Y      ;CHK FOR BY2 OPERAND
                CMPB    #LSNOP
                BEQ     COMPB2
                LDX     COBJMARK
                LDA     CBY2
                STA     B,X
COMPB2          LDB     LSWD1OFF,Y      ;CHK FOR WD1 OPERAND
                CMPB    #LSNOP
                BEQ     COMPB3
                LDX     COBJMARK
                ABX
                LDD     CWD1
                STD     ,X
COMPB3          LDB     LSWD2OFF,Y      ;CHK FOR WD2 OPERAND
                CMPB    #LSNOP
                BEQ     COMPB4
                LDX     COBJMARK
                ABX
```

```
                LDD     CWD2
                STD     ,X
COMPB4          LDB     LSWD3OFF,Y      ;CHK FOR WD3 OPERAND
                CMPB    #LSNOP
                BEQ     COMPB5
                LDX     COBJMARK
                ABX
                LDD     CWD3
                STD     ,X
COMPB5          LDB     LSWD4OFF,Y      ;CHK FOR WD4 OPERAND
                CMPB    #LSNOP
                BEQ     COMPB6
                LDX     COBJMARK
                ABX
                LDD     CWD4
                STD     ,X
COMPB6          LDB     LSWD5OFF,Y      ;CHK FOR WD5 OPERAND
                CMPB    #LSNOP
                BEQ     COMPC0
                LDX     COBJMARK
                ABX
                LDD     CWD5
                STD     ,X
;
;UPDATE ELEMENT ADDRESS TABLE (ADRTBL) AND TABLE OF ADDRESSES OF T/F BRANCHS (TBRTBL, FBRTBL)
;
COMPC0          LDB     CELCNT
                ASLB
                CLRA
                TFR     D,X             ;INDEX INTO WORD TABLES
                LDD     COBJMARK
                STD     CADRTBL,X       ;SAVE ADR OF THIS ELEM
                LDY     CSTRUC
                LDB     LSTBROFF,Y      ;SKIP IF NOP
                CMPB    #LSNOP
                BEQ     COMPC1
                LDD     COBJMARK
                ADDB    LSTBROFF,Y
                ADCA    #$00
                STD     CTBRTBL,X       ;SAVE ADR OF ELEMS TRUE BRANCH
COMPC1          LDB     LSFBROFF,Y      ;SKIP IF NOP
                CMPB    #LSNOP
                BEQ     COMPCX
                LDD     COBJMARK
                ADDB    LSFBROFF,Y
                ADCA    #$00
                STD     CFBRTBL,X       ;SAVE ADR OF ELEMS FALSE BRANCH
COMPCX          LDD     COBJEND
                STD     COBJMARK
                INC     CELCNT
                LBRA    COMPA0
;
;SECOND PASS, LAY IN BRANCHES, START WITH TRUE BRANCH
;
COMPBRANCH      CLR     CELCNT
COMPD0          LDB     CELCNT
                LDX     CDATAOFF
```

```
                CMPB    LDROBJCOUNT,X
                LBCC    COMPDONE            ;DONE WITH RUNG
                JSR     CELTOCSTRUC         ;SEE IF TRUE BRANC EXISTS
                LDY     CSTRUC
                LDB     LSTBROFF,Y
                CMPB    #LSNOP
                BEQ     COMPE0              ;NO TRUE BRANCH, TRY FALSE
                LDY     #CTBRTBL
                LDB     CELCNT
                ASLB
                LDX     B,Y                 ;X=ADR OF TBRN
                LDY     CDATAOFF
                LEAY    TRUEARCS,Y
                LDB     CELCNT
                LDB     B,Y                 ;B=TRUE DEST SYLLABUS NUMBER
                CMPB    #ENDARC             ;ARC TO NEXT RUNG CODE
                BNE     COMPD1
                LDD     COBJEND
                JSR     BRNXTOD             ;MAKE BRANCH FROM X TO D
                BRA     COMPE0              ;TRY FALSE ARC
COMPD1          ASLB                        ;B WAS DEST SYLLABUS NUMBER
                LDY     #CADRTBL
                LDD     B,Y                 ;D=ADDRESS OF DEST
                JSR     BRNXTOD             ;SAVE TRUE BRANCH FROM X TO D
;
;SAVE FALSE BRANCH
;
COMPE0          LDY     CSTRUC
                LDB     LSFBROFF,Y
                CMPB    #LSNOP
                BEQ     COMPEX              ;NO FALSE BRNCH, TRY NEXT ELEMENT
                LDY     #CFBRTBL
                LDB     CELCNT
                ASLB
                LDX     B,Y                 ;X=ADR OF FBRN
                LDY     CDATAOFF
                LEAY    FALSEARCS,Y
                LDB     CELCNT
                LDB     B,Y                 ;B=FALSE DEST SYLLABUS NUMBER
                CMPB    #ENDARC
                BNE     COMPE1
                LDD     COBJEND             ;ARC TO NEXT RUNG CODE
                JSR     BRNXTOD             ;BRANCH FROM X TO D
                BRA     COMPEX              ;TRY NEXT ELEMENT
COMPE1          ASLB                        ;B WAS DEST SYLLABUS NUMBER
                LDY     #CADRTBL
                LDD     B,Y                 ;D=ADDRESS OF DEST
                JSR     BRNXTOD             ;SAVE FALSE BRANCH
COMPEX          INC     CELCNT
                LBRA    COMPDO
COMPDONE        LDX     COBJEND             ;END OF RUNG IN X
                RTS
;
;
;
;FILL CWD1, CWD2, CBY1, CBY2 FROM CSRCSTRT, CELCNT
```

```
;
MKOPERANDS      JSR     CELTOSRC
                TFR     D,Y             ;SAVE IN Y
                ANDB    #$7F
                LDX     #IOMEMORY
                ABX
                STX     CWD1
                STX     CWD2
                LDX     #WRDMEMORY
                LSLB
                ABX
                STX     CWD3
                STX     CWD4
                TFR     Y,D
                ANDA    #$01
                STD     CWD5
                TFR     Y,D
                LSLB                    ;FIRST JUSTIFY I/O SOURCE
                ROLA
                ANDA    #$03
                LDX     #SRCMASKS
                LDB     A,X
                STB     CBY1
                COMB                    ;BY2 IS COMPLIMENT OF BY1
                STB     CBY2
                RTS
;
;
;
;SET CSTRUC FROM CELCNT, SRCSTRT
;
CELTOCSTRUC     JSR     CELTOSRC
                PSHS    CC              ;CARRY SET INDICATES FALSE OUTPUT
                LSRA                    ;RETREIVE OPCODE
                LSRA
                LSRA
                ANDA    #$1F
                LSLA
                LSLA
                LDX     #LSFTRS         ;OPCODE IS OFFSET INTO LADDER STRUCTURE TBL
                PULS    CC              ;CARRY CLEAR, NORMAL ELEMENT
                BCC     CTOCSTR1
                LEAX    $02,X           ;FOR FALSE OUTPUT USE SECOND STRUCTURE
CTOCSTR1        LDX     A,X
                STX     CSTRUC
                RTS
;
;
;
;RETREIVE SOURCE FOR ELEMENT CELCNT (CELCNT IS INDEX INTO SYLLABUS)
;SET CARRY IF CELCNT IS FALSE OUTPUT ELEMENT.
;
CELTOSRC        LDY     CDATAOFF
                LEAY    LDRSYLLABUS,Y
                LDB     CELCNT
                LDB     B,Y
```

```
                LDA     #LASTSRCEL      ;ASSUME TRUE COIL
                CMPB    #"T"
                BEQ     CELTOSRC1
                CMPB    #"F"
                BEQ     CELTOSRC1
                SUBB    #"a"            ;ANY OTHER ELEMENT
                TFR     B,A
CELTOSRC1       ASLA                    ;WORD OFFSET INTO LDRSOURCE
                LDY     CDATAOFF
                LEAY    LDRSOURCE,Y
                LDY     A,Y             ;SOURCE IN Y
                CMPB    #"F"
                BEQ     CELTOSRC2
                ANDCC   #NOT CCCARRY    ;NOT FALSE OUTPUT
                TFR     Y,D
                RTS
CELTOSRC2       ORCC    #CCCARRY ;IS FALSE OUTPUT
                TFR     Y,D
                RTS
;
;
;
;MAKE A BRANCH FROM X TO D AND SAVE AT X.
;
BENXTOD         LEAX    2,X
                PSHS    X
                SUBD    ,S++
                STD     ,--X
                RTS
;
;
;
;LADDER ELEMENT CODE STRINGS
;
;                       LDA XXXX    BITA #XX LBNE XXXX       LBRA XXXX
CSEXON          DB      $B6, 00, 00, $85, 00, $10, $26, 00, 00, $16, 00, 00
;                       LDA XXXX    BITA #XX LBEQ XXXX       LBRA XXXX
CSEXOFF         DB      $B6, 00, 00, $85, 00, $10, $27, 00, 00, $16, 00, 00
;                       LDD XXXX    STD LDRACCUM LBRA XXXX
CSGET           DB      $FC, 00, 00, $FD
                DW      LDRACCUM
                DB      $16, 00, 00
;                       LDD #XXXX   STD LDRACCUM LBRA XXXX
CSCST           DB      $CC, 00, 00, $FD
                DW      LDRACCUM
                DB      $16, 00, 00
;                       LDD #XXXX   CMPD LDRACCUM   LBCS XXXX LBRA XXXX
CSGRT           DB      $CC, 00, 00, $10, $B3
                DW      LDRACCUM
                DB      $10, $25, 00, 00, $16, 00, 00
;                       LDD LDRACCUM CMPD #XXXX     LBCS XXXX LBRA XXXX
CSLES           DB      $FC
                DW      LDRACCUM
                DB      $10, $83, 00, 00, $10, $25, 00, 00, $16, 00, 00
;                       LDA XXXX    ORA #XX STA XXXX    LBRA XXXX
CSENGZT         DB      $B6, 00, 00, $8A, 00, $B7, 00, 00, $16, 00, 00
;                       LDA XXXX    ANDA #XX STA XXXX    LBRA XXXX
CSENGZF         DB      $B6, 00, 00, $84, 00, $B7, 00, 00, $16, 00, 00
```

```
;                       LDD #0000    STD XXXX
CSRTR           DB      $CC, 00, 00, $FD, 00, 00
;                       LDX XXXX    LEAX 1,X    STX XXXX
CSCTU           DB      $BE, 00, 00, $30, $88, $01, $BF, 00, 00
;                       LDD LDRACCUM STD XXXX
CSPUT           DB      $FC
                DW      LDRACCUM
                DB      $FD, 00, 00
;                       LDD XXXX   STB SCHEDSEL   LDA #$AA   STA WELDINIT   LBRA XXXX
CSWELDT         DB      $FC, 00, 00, $F7
                DW      SCHEDSEL
                DB      $86, $AA, $B7
                DW      WELDINIT
                DB      $16, 00, 00
;                       CLR WELDINIT LBRA XXXX
CSWELDF         DB      $7F
                DW      WELDINIT
                DB      $16, 00, 00
;
;
;
;
;LADDER STRUCTURES
;FORMAT IS:     POINTER TO CODE, CODE LENGTH
;               OFFSET TO WORD1, WORD2, WORD3, WORD4, WORD5 (1 & 2 ARE IOMEM, 3 & 4 WRDMEM, 5 CST)
;               OFFSET TO BYTE1, BYTE2 (BYTE 1 IS SRCMASK, 2 IS COMPLIMENT)
;               OFFSET TO TRUE BRANCH, FALSE BRANCH
;
LSNOTH          DW      $00
                DB      $00
                DB      LSNOP, LSNOP, LSNOP, LSNOP, LSNOP
                DB      LSNOP, LSNOP
LSEXON          DW      CSEXON
                DB      $0C
                DB      $01, LSNOP, LSNOP, LSNOP, LSNOP
                DB      $04, LSNOP
                DB      $07, $0A
LSEXOFF         DW      CSEXOFF
                DB      $0C
                DB      $01, LSNOP, LSNOP, LSNOP, LSNOP
                DB      $04, LSNOP
                DB      $07, $0A
LSGET           DW      CSGET
                DB      $09
                DB      LSNOP, LSNOP, $01, LSNOP, LSNOP
                DB      LSNOP, LSNOP
                DB      $07, LSNOP
LSCST           DW      CSCST
                DB      $09
                DB      LSNOP, LSNOP, LSNOP, LSNOP, $01
                DB      LSNOP, LSNOP
                DB      $07, LSNOP
LSGRT           DW      CSGRT
                DB      $0E
                DB      LSNOP, LSNOP, LSNOP, LSNOP, $01
                DB      LSNOP, LSNOP
                DB      $09, $0C
```

```
LSLES       DW   CSLES
            DB   $0E
            DB   LSNOP, LSNOP, LSNOP, LSNOP, $05
            DB   LSNOP, LSNOP
            DB   $09, $0C
LSENGZT     DW   CSENGZT
            DB   $0B
            DB   $01, $06, LSNOP, LSNOP, LSNOP
            DB   $04, LSNOP
            DB   $09, LSNOP
LSENGZF     DW   CSENGZF
            DB   $0B
            DB   $01, $06, LSNOP, LSNOP, LSNOP
            DB   LSNOP, $04
            DB   $09, LSNOP
LSRTR       DW   CSRTR
            DB   $06
            DB   LSNOP, LSNOP, $04, LSNOP, LSNOP
            DB   LSNOP, LSNOP
            DB   LSNOP, LSNOP
LSCTU       DW   CSCTU
            DB   $09
            DB   LSNOP, LSNOP, $01, $07, LSNOP
            DB   LSNOP, LSNOP
            DB   LSNOP, LSNOP
LSFUT       DW   CSFUT
            DB   $06
            DB   LSNOP, LSNOP, $04, LSNOP, LSNOP
            DB   LSNOP, LSNOP
            DB   LSNOP, LSNOP
LSWELDT     DW   CSWELDT
            DB   $0E
            DB   LSNOP, LSNOP, $01, LSNOP, LSNOP
            DB   LSNOP, LSNOP
            DB   $0C, LSNOP
LSWELDF     DW   CSWELDF
            DB   $06
            DB   LSNOP, LSNOP, LSNOP, LSNOP, LSNOP
            DB   LSNOP, LSNOP
            DB   $04, LSNOP
;
;
;
;
;POINTERS TO LADDER STRUCTURES (BY OPCODE) (2 PEICES OF CODE PER ELEMENT)
;
LSPTRS      DW   LSNOTH,      LSNOTH        ;BLANK
            DW   LSEXON,      LSNOTH        ;EXAMINE ON
            DW   LSEXOFF,     LSNOTH        ;EXAMINE OFF
            DW   LSNOTH,      LSNOTH        ;PATH
            DW   LSGET,       LSNOTH        ;GET
            DW   LSNOTH,      LSNOTH        ;CNU
            DW   LSCST,       LSNOTH        ;CST
            DW   LSGRT,       LSNOTH        ;)
            DW   LSLES,       LSNOTH        ;(
            DW   LSENGZT,     LSENGZF       ;ENGZ
            DW   LSENGZT,     LSNOTH        ;LATCH
```

```
        DW      LSENGZF,        LSNOTH          ;UNLATCH
        DW      LSNOTH,         LSNOTH          ;TON
        DW      LSNOTH,         LSNOTH          ;TOF
        DW      LSNOTH,         LSNOTH          ;RTO
        DW      LSNOTH,         LSNOTH          ;RTR
        DW      LSCTU,          LSNOTH          ;CTU
        DW      LSRTR,          LSNOTH          ;CTR
        DW      LSPUT,          LSNOTH          ;PUT
        DW      LSWELDT,        LSWELDF         ;WELD
;
;LADDER SOURCE MASKS
;
SRCMASKS DB     INMASK, OUTMASK, FLAGMASK
;
;
;
;DEFAULT SOURCE LADDER
;
DFLTLDR     DW   $1000,$0000,$0000    ;DEFAULT LADDER
            DW   $0800,$0000,$0000    ;
            DW   $0800,$0000,$0000    ; Y      AGL
            DW   $0800,$0000,$0000    ; A      BHM
            DW   $0800,$0000,$0000    ;D W     CIN
            DW   $A280                ;A       DJO
            DW   $3001,$0000,$0000    ;E S     EKP
            DW   $0800,$0000,$0000    ;R I     F
            DW   $0800,$0000,$0000    ; H
            DW   $0800,$0000,$0000    ; T
            DW   $0800,$0000,$0000    ;
            DW   $9A80                                ;
DFLTLDREND  EQU  $
;
;
;DEFAULT IO ASSIGNMENTS (IN SAME ORDER AS ASGDATA)
;
DFLTASG     DB   0                    ;WELD/NOWELD
            DB   1                    ;RECTRACT
            DB   2                    ;E STOP
            DB   3                    ;STOP RESET
            DB   4                    ;RETRACTION LATCH
            DB   5                    ;STEPPER RESET
            DB   0                    ;FAULT OUTPUT
            DB   1                    ;ALERT OUTPUT
            DB   2                    ;RETRACT OUTPUT
            DB   3                    ;SHUNT TRIP OUPUT
            DB   4                    ;DONE OUTPUT
DFLTASGEND  EQU  $
;
```

We claim:

1. In a process where the condition of a plurality of logic elements, including a first logic element and a last logic element, controls an action, a method for preparing a computer program for determining said action, said program being for execution in a digital computer having a processor and a memory, said method comprising the steps of:

developing an expression for storage in said memory, said expression defining the effect said logic elements have on said action;

for each condition for each logic element, using said processor for examining said expression to determine another logic element within said expression which controls said action, thereby defining condition determining control paths;

generating code for execution by said computer for examining the conditions of only those logic elements necessary to determine the action in an order directed by said condition determining control paths.

2. The method defined by claim 1 wherein said action is known upon completion of said examination of each of said elements along one of said condition determining control paths.

3. The method defined by claim 1 wherein said condition determining control paths consist of a true path and a false path.

4. The method defined by claim 3 wherein said generating code step comprises the steps of:
preparing skeletal code in said memory which includes the evaluation of each of said logic elements; and,
inserting relative offsets from said first logic element to each of said other logic elements.

5. The method defined by claim 4 including the step of simplifying said expression prior to said defining of said condition determining paths.

6. In a process where the condition of a plurality of logic elements determines the action taken by an action element, wherein said plurality of logic elements includes a last logic element, a method for preparing a computer program for determining said action to be taken by said action element, said program being for execution in a digital computer having a processor and a memory, said method comprising the steps of:
preparing an expression for storage in said memory defining the interaction between said logic elements;
for each condition of each logic element, using said processor for identifying each logic element within said expression that controls said action, thereby identifying condition determining paths within said expression;
generating code for execution by said computer for evaluating the conditions of only those logic elements necessary to determine the action, said code including instructions for branching from one of said logic elements to another along said condition determining paths.

7. The method defined by claim 6 wherein said action taken by said action element is determined by the condition of the last logic element.

8. The method defined by claim 6 wherein said expression is a Boolean expression.

9. The method defined by claim 7 or claim 8 wherein the condition for each of said logic elements is one of true and false.

10. The method defined by claim 9 including the step of simplifying said expression prior to identifying said condition determining paths.

11. In a process where the condition of a plurality of logic elements including a last logic element, controls a result, a method for preparing a computer program for determining said result, said program being for execution in a digital computer having a processor and a memory, said method comprising the steps of:
preparing a Boolean expression for storage in said memory defining the action of said elements on said result:
using said processor for preparing truth tables for each condition of each of said elements which identify each element within said expression controlling said result, thereby defining true and false paths;
generating code which upon being executed by said computer examines the condition of each of said elements and branches from one element to a next element along said true and false paths.

12. The method defined by claim 11 wherein said result is known upon said examination of the last of said elements along one of said true and false paths.

13. The method defined by claim 12 wherein said code generating step comprises:
for each of said elements, identifying said branches to said next element, along said paths;
preparing skeletal code with instructions for evaluating the conditions of each of said elements; and
inserting offsets to said elements.

14. The method defined by claim 11 or 13 including the step of simplifying said expression prior to said preparing of said truth tables.

15. In a process where the condition of a plurality of logic elements controls an action, a method for preparing a computer program for determining said action, said program being for execution in a digital computer having a processor and a memory, said method comprising the steps of:
preparing for storage in said memory a Boolean expression for said logic elements;
identifying a true path from said expression for each logic element by ignoring disjunctive elements using said processor;
identifying a false path from said expression for each logic element by ignoring conjunctive elements;
generating code which includes code which upon being executed by said computer examines the condition of each of said logic elements and branching instructions which directs branching along either said true path or false path as a function of the condition of each of of said logic elements.

16. The method defined by claim 15 including the simplification of said expression prior to said identification of said true and false paths.

17. The method defined by claim 16 wherein said simplification comprises the factoring of common terms within said expression and the removal of redundant parenthesis.

18. In a ladder structure comprising a plurality of rungs where each rung comprises a plurality of interconnected logic elements, the condition of said elements determining an action for said rung, a method for preparing a computer program for determining said action for each of said rungs, said program being for execution on a digital computer having a processor and memory, said method comprising the steps of:
for each of said rungs, preparing for storage in said memory a Boolean expression defining the coupling of said elements in said rung;
for each condition of each element within each expression, using said processor for determining a next element within said expression that effects said action thereby identifying true and false paths for said expression;
generating code which upon being executed by said computer is for evaluating the condition of each element in said expressions such that the order of said evaluation is dictated by said true and false paths.

19. The method defined by claim 16 wherein said action is determined by the condition of the last one of said elements along one of said true and false paths.

20. The method defined by claims 16 or 19 including the simplification of said expressions prior to said identification of said true and false paths.

21. The method defined by claim 20 wherein said simplification comprises the factoring of common terms within said expressions and the removal of redundant parenthesis.

22. In a ladder structure comprising a plurality of rungs where each rung includes a plurality of logic elements the conditions of which determine the rungs' output, a method for preparing a computer program for determining said outputs, said program being for execution on a digital computer having a processor and memory, said method comprising the steps of:

preparing for storage in said memory Boolean expressions for each rung which define the coupling between said elements of said rung;

using said processor for determining a true path from each of said elements in each of said expressions by ignoring disjunctive elements in said expressions;

using said processor for determining a false path from each of said elements in each of said expressions by ignoring conjunctive elements in said expressions;

generating code which upon being executed by said computer results in the evaluation of the condition of each element and which includes branching instructions which follow said true paths and false paths based on the condition of said element.

23. The method defined by claim 22 wherein said code generation step comprises:

preparation of a skeletal code in a first pass which includes instructions for the examination of each element, and a second pass wherein the paths from each element are resolved by determining relative offsets between the elements along said paths.

24. The method defined by claim 23 including the steps of optimizing said expressions prior to said determining said true and false paths.

25. The method defined by claim 24 wherein said optimization step comprises the steps of factoring common terms of disjunctive terms within said expressions and removing redundant parenthesis within said expressions.

* * * * *